United States Patent [19]

Tatum, Jr. et al.

[11] Patent Number: 4,994,629
[45] Date of Patent: Feb. 19, 1991

[54] ELECTRICAL GROUNDING SYSTEM

[75] Inventors: Joseph F. Tatum, Jr.; Thomas H. Lewis, Jr., both of Hattiesburg, Miss.

[73] Assignee: Cathodic Engineering Equipment Co., Inc., Hattiesburg, Miss.

[21] Appl. No.: 550,637

[22] Filed: Jul. 10, 1990

Related U.S. Application Data

[63] Continuation-in-part of Ser. No. 522,035, May 11, 1990.

[51] Int. Cl.$^5$ .................... H01R 4/66; H01B 1/18; C09K 3/00
[52] U.S. Cl. ........................ 174/6; 106/717; 252/502
[58] Field of Search .................. 174/6, 7; 106/717; 252/502; 204/196, 197

[56] References Cited

U.S. PATENT DOCUMENTS 4,786,388 11/1988 Tatum, Jr. .................. 174/6 X

*Primary Examiner*—Laramie E. Askin
*Attorney, Agent, or Firm*—Dowell & Dowell

[57] ABSTRACT

An electrical ground system as a metal conductor surrounded by a composition comprising a mixture of portland cement, sized calcined fluid petroleum coke, micro-carbon rods and carbon black.

18 Claims, No Drawings

ELECTRICAL GROUNDING SYSTEM

This application is a continuation-in-part of our application filed May 11, 1990 entitled GROUND ELECTRODE BACKFILL COMPOSITION, Ser. No. 07/522,035.

BACKGROUND OF THE INVENTION

1. Field of the Invention

This invention relates to the grounding of electrical conductors and more particularly to the provision of a medium in which a ground electrode ma be embedded for advantageous results.

2. Description of the Prior Art

Ground electrodes have been used for many purposes well known in the art. One type has included a metal conductor, post or pipe arranged in contact with carbonaceous material such as coke or charcoal to enlarge the effective area of contact between the metal conductor and the earth. These have generally depended on maintaining the presence of moisture and have included containers for holding th material in contact with the conductor. They have been subject to the problems of drying out, corrosion, instability and fluctuation in conductivity. Examples of U.S. patents directed to this type of ground are Jones, 873,375, Turner, U.S. Pat. No. 895,916, Pardee, U.S. Pat. No. 1,013,305, Banks, U.S. Pat. No. 1,111,783, Brach, U.S. Pat. No. 1,138,186, Vogel, U.S. Pat. No. 1,288,303, Preston, U.S. Pat. No. 1,856,506, Mudd, U.S. Pat. No. 2,552,208 and Heise, U.S. Pat. No. 2,553,654.

Another type of ground electrode is employed at or just beneath the surface of the earth in order to reduce the step potential differences across the earth or a surface for walking, as for example at an electrical utility substation. Thus, during an electrical fault, high magnitude electrical potential differences may be present which would constitute a hazard to an individual walking in the area. In order to meet this problem, a common practice has been to bury bare copper grounding wires forming a mesh arrangement in the affected area.

Various arrangements and compositions of carbonaceous materials in a matrix system, including concrete, for use on various surfaces, walkways, floors, roadways and the like are described in the U.S. patents to Minsk, U.S. Pat. No. 3,573,427, Freeman et al., U.S. Pat. No. 3,962,142, Wiley, U.S. Pat. No. 4,806,272 and in Japanese patents Nos. JE0044233 of November 1978 and JA0126282 of October 1981.

The above mentioned U.S. patent to Freeman et al. discloses a settable composition including a cementitious material and an aggregate which includes carbonaceous material of at least two types, one type being relatively large carbonaceous particles and the other type being relatively small carbonaceous particles. Examples of the relatively large carbonaceous particles are calcined oil coke. An example of the relatively small particles is acetylene black.

The U.S. patnet to Nigol et al., 3,941,918 discloses a cement for mechanically and electrically joining metal hardware to an insulator shell, the cement including portland cement admixed with graphite fibers and high structure carbon black.

SUMMARY OF THE INVENTION

It is an object of the invention to provide the combination of a ground electrode and an embedding material of improved conductivity and durability.

A further object is to provide a high conductivity ground electrode having an extended durable surface and which is highly resistant to deterioration or other changes in its characteristics.

A further object is to provide a ground electrode of improved characteristics and which may be easily installed by persons of ordinary skill.

The invention is characterized by the use of one or more metal conductors embedded in a nonporous cementitious composition of portland cement, sized calcine fluid petroleum coke, micro-carbon rods and carbon black.

DESCRIPTION OF THE PREFERRED EMBODIMENT

In one embodiment of the invention, a metal conductor such as a post, rod or pipe, ordinarily copper, is positioned in a hole in the ground, the hole usually being vertical and of a diameter substantially larger than that of the conductor. The conductor is embedded in a settable composition in accordance with the present invention. The composition includes a mixture of portland cement, calcined fluid petroleum coke, micro-carbon graphite rods and high structure, electrically conductive carbon black. Such composition has greatly enhanced electrical conductivity, decreased porosity and sets up similar to conventional concrete.

As a result of experimentation we have found that by using a blend of calcined fluid petroleum coke, very small diameter and short but strong graphite rods, and the addition of carbon black we could increase the amount of portland cement in order to enhance the nonporous characteristic of the composition and improve the qualities of the material.

Such qualities include improved stability, that is, the reduced likelihood of deterioration due to shifting of materials; improved durability due to the binding together of the composition and the conductor; improved resistance to changes in characteristics of the embedding material, such as drying out; and generally higher conductivity due to cohesiveness of the materials and their combining.

The carbon black which is used is of particularly fine grain and low volatility and greatly enhances the conductance between the calcined fluid petroleum coke particles. The graphite rods, in that they are rigid, also enhance the contact between the calcined fluid petroleum coke particles.

An example of a composition in accordance with the present invention is as follows:

| | | |
|---|---|---|
| Portland (API Class A) Cement | 30-50% | by weight |
| Calcined Fluid Petroleum Coke | 50-70% | by weight |
| Graphite Rods | 0.05-5.0% | by weight |
| Carbon Black | 0.05-5.0% | by weight |

In the composition the fluid petroleum coke should preferably be sized less than 16 mesh. (Tyler Standard 16 Sieve).

The graphite rods are commonly referred to as micro-carbon rods. An example is a product described as Micro-Carbon 90 produced by Fibertec of Bridgewater, Mass. Its specifications include a length distribution in which 1% is less than 10 microns, the mean is 100 microns, and 1% is more than 460 microns. The minimum filament diameter is 8 microns, the nominal is 15 microns and the maximum is 28 microns. It is of high purity, being free of any foreign matter, oil or grease. The product has a bulk density of approximately 0.165 grams per cc and a resistivity of approximately 1375 micro-ohm-cm at 0° C.

It has been found that preferred results are obtained if the micro-rods range in length from 30–600 microns, the diameter 6–14 microns, and the carbon content from 98.5% to 99.8%.

In example of a carbon black product having the qualities required for use in the present invention is Vulcan XC-72 which is produced by the Cabot Corporation of Boston, Mass. The company's specifications describe the product as having the lowest electrical resistivity, an apparent density of 6–16 pounds per cubic foot, a surface area of 254 square meters per gram, and a mean particle size of 30 millimicrons. The product also is specified as having a volatile content of 2.0% and fixed carbon of 98.0%.

A carbon black ranging from 200 to 1500 square meters per gram, a structure of 150–500 cubic centimeters per 100 grams and a volatile content of 0.5% to 2.0% by weight is preferred in the practice of the present invention. The surface area and structure are indicative of the physical properties of the carbon black and its degree of conductivity. The surface area is indicative of the primary particle and its porosity. Higher surface area carbon has more aggregate or particles per unit weight, thus resulting in smaller inter-particle distances, and therefore are more generally more electrically conductive.

Structure, as defined by the dibutylphthalate (DBP) absorption test, indicates the number of particles which make up the primary carbon black aggregate and its shape. High structure particles have large highly branched clusters which increase the inter-particle contact, resulting in higher electrical conductivity.

It is recognized that in a given volume of carbon black the empty space or void volume is unusually large. Thus, in grams per liter), the density value for most blacks upon recovery, the void volume is 97–98%, based on a specific weight of the particles of 1.90. These voids appear to be indicative of a carbon black structure, or in other words the degree of particle aggregation.

In the present application it is believed that the particular nature of the carbon black and the micro-carbon rods provide a bridging between the calcined fluid petroleum coke particles that is especially conductive. Thus, it is believed that with the high structure and high surface area carbon black particles of very small size there are many parallel contact points between adjacent particles.

As used in the present invention, the composition forms a solid, non-water soluble earth contact backfill or embedding environment with corrosion inhibiting properties with respect to the conductor. In high resistivity soils, the effect of placing the composition around a metal conductor is to increase the effective size or area of the ground connection. For example, if a $\frac{5}{8}''\times 10'$ copper ground rod is placed in the center of a $6''\times 15'$ vertical hole filled with the composition of the present invention, the effective grounding dimensions become $6''\times 15'$, thus lowering the resistance to the earth approximately 50%.

Another embodiment of the invention, as indicated above is in connection with the use of buried copper grounding wires forming a mesh in the area of an electric utility substation. In such environment, the composition of the present invention would be spread over the site in a relatively thin layer with copper wire mesh embedded within it in order to approach the conductivity of a solid conducting plate, thus equalizing the electric potentials across the area.

We claim:

1. An electrical ground installed in the earth comprising an electrical conductor, said earth having a bore hole of a length and diameter to receive said conductor with said conductor in spaced relation from the sides of such bore hole, and a conductive non-porous cementitions composition substantially surrounding said conductor and in intimate contact with said rod means and the earth, said composition comprising a mixture of portland cement, sized calcined fluid petroleum coke, micro-carbon rods, and carbon black.

2. The invention of claim 1 in which the sized calcined fluid petroleum coke is of a size to pass a Tyler standard number 16 sieve.

3. The invention of claim 1 in which the micro-carbon rods have a length of approximately 30 to 600 microns and a diameter of approximately 6 to 14 microns.

4. The invention of claim 1 in which the carbon black is of high structure.

5. The invention of claim 1 in which the carbon black has a surface area ranging from 200 to 1500 square meters per gram, a structure ranging from 150 to 500 cubic centimeters per 100 grams, and a volatile content ranging from 0.5 to 2.0% by weight.

6. The invention of claim 1 in which said composition comprises a mixture of the following components by weight: portland cement 30 to 50%, sized calcined fluid petroleum coke 50 to 70%, micro-carbon rods 0.05 to 5.0%, and high structure carbon black 0.05 to 5.0%.

7. The invention of claim 6 in which the sized calcined petroleum coke is of a size to pass a Tyler standard number 16 sieve.

8. The invention of claim 7 in which the micro-carbon rods are in the range of length of 30 to 600 microns, a diameter of 6 to 14 microns, and a carbon content from approximately 98.5 to 99.8%.

9. The invention of claim 6 in which the mean particle size of the carbon particles approximates 30 millimicrons.

10. An electrical potential equalizer installed in the earth where it is subject to high potential differences between adjacent areas, comprising an array of interconnected conductors forming a mesh and lying at or buried just beneath the surface of the earth in and overlapping such areas, and a conductive non-porous cementitious composition substantially embedding said conductors and in intimate contact therewith and with the earth, said composition comprising a mixture of portland cement, sized calcined fluid petroleum coke microcarbon rods and carbon black.

11. The invention of claim 10 in which the sized calcined fluid petroleum coke is of a size to pass a Tyler standard number 16 sieve.

12. The invention of claim 10 in which the micro-carbon rods have a length of approximately 30 to 600 microns and a diameter of approximately 6 to 14 microns.

13. The invention of claim 10 in which the carbon black is of high structure.

14. The invention of claim 10 in which the carbon black has a surface area ranging from 200 to 1500 square meters per gram, a structure ranging from 150 to 500 cubic centimeters per 100 grams, and a volatile content ranging from 0.5 to 2.0% by weight.

15. The invention of claim 10 in which said composition comprises a mixture of the following components by weight: portland cement 30 to 50% sized calcined fluid petroleum coke 50 to 70%, micro-carbon rods 0.05 to 5.0%, and high structure carbon black 0.05 to 5.0%.

16. The invention of claim 15 in which the sized calcined petroleum coke is of a size to pass a Tyler standard number 16 sieve.

17. The invention of claim 16 in which the micro-carbon rods are in the range of length of 30 to 600 microns, a diameter of 6 to 14 microns, and a carbon content from approximately 98.5 to 99.8%.

18. The invention of claim 15 in which the mean particle size of the carbon particles approximates 30 millimicrons.

* * * * *

UNITED STATES PATENT OFFICE
CERTIFICATE OF CORRECTION

PATENT NO. : 4,994,629

DATED : 02/19/91

INVENTOR(S) : Joseph F. Tatum, Jr. & Thomas H. Lewis, Jr.

It is certified that error appears in the above-identified patent and that said Letters Patent is hereby corrected as shown below:

Column 4,

In Claim 1, line 19, cancel "rod means" and insert --conductor--.

Signed and Sealed this

Twenty-first Day of July, 1992

Attest:

DOUGLAS B. COMER

*Attesting Officer*  *Acting Commissioner of Patents and Trademarks*